United States Patent Office 3,481,314
Patented Dec. 2, 1969

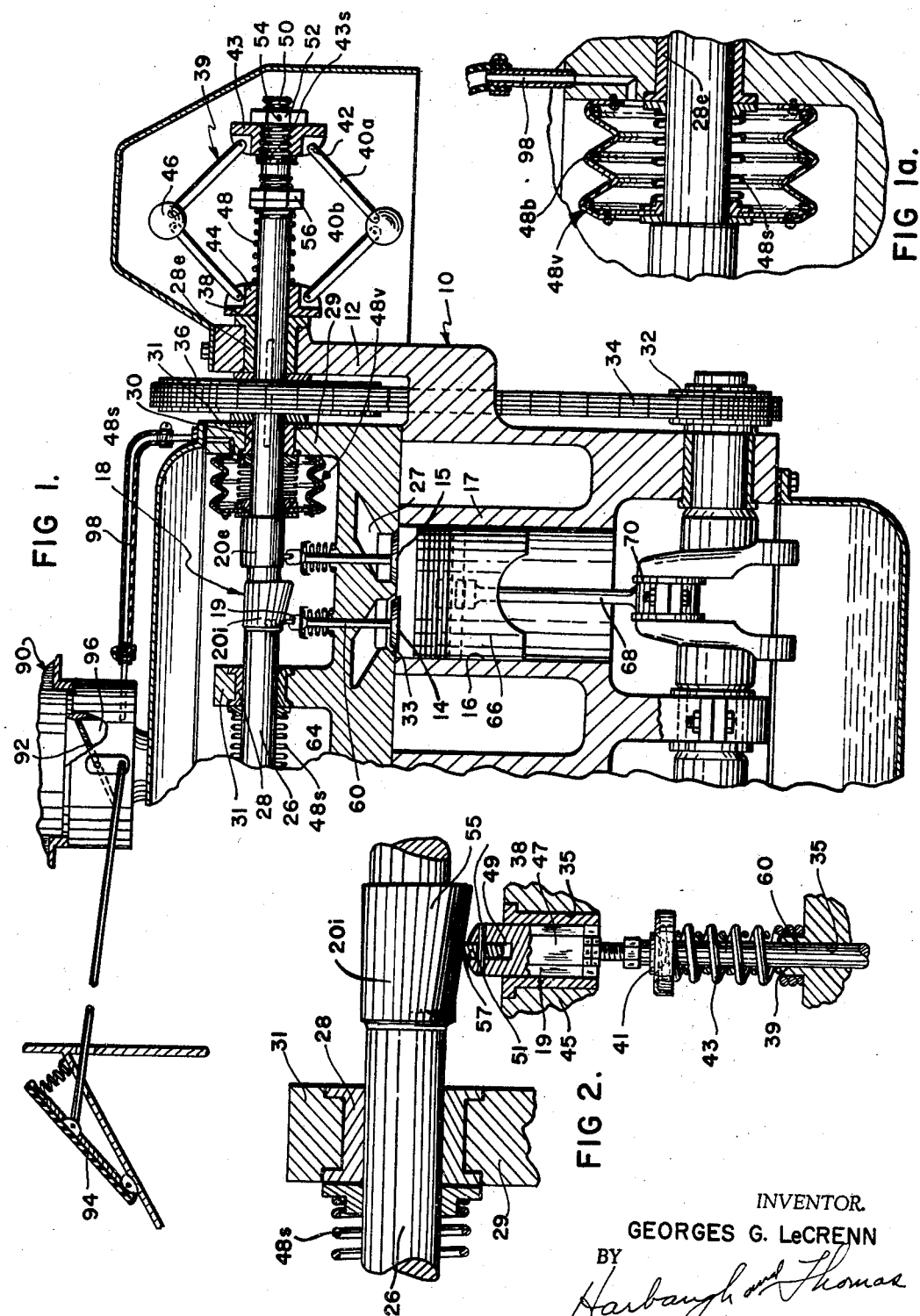

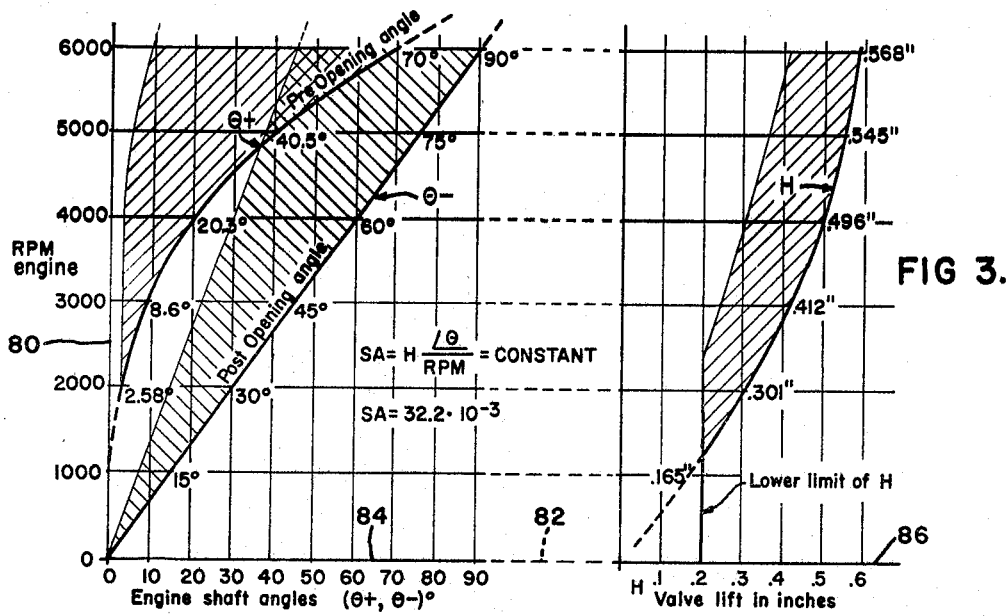
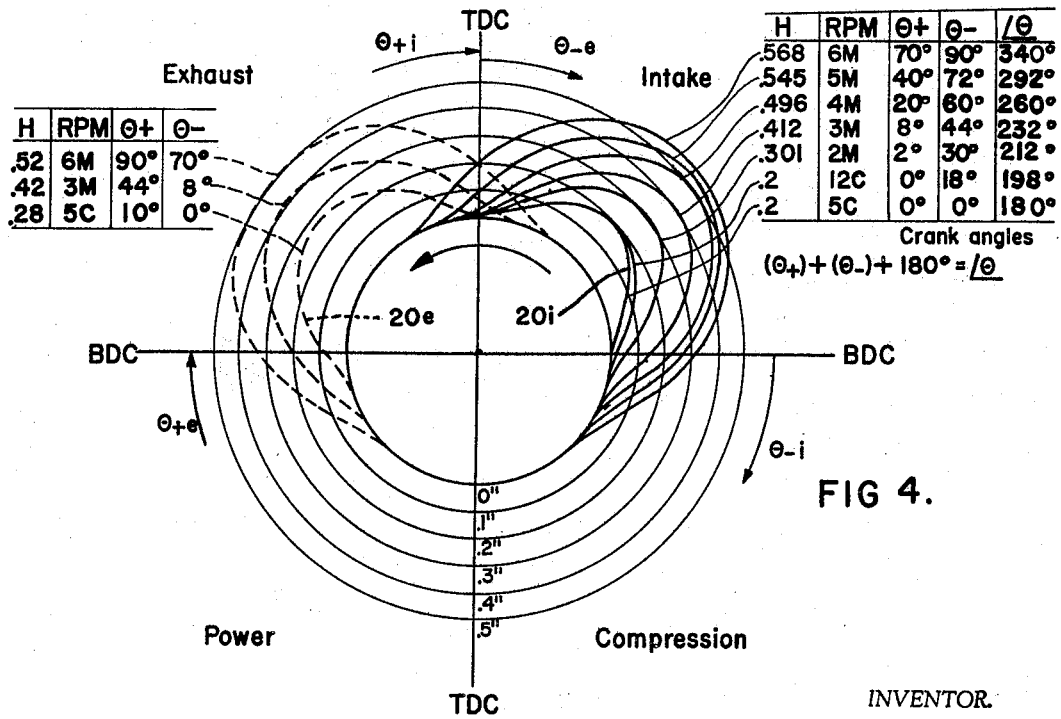

3,481,314
MEANS FOR OPTIMIZING THE PERFORMANCE OF INTERNAL COMBUSTION ENGINES
Georges G. LeCrenn, 2402 Grant St., Evanston, Ill. 60201
Filed Aug. 29, 1967, Ser. No. 664,048
Int. Cl. F01l 1/08, 1/20, 13/00
U.S. Cl. 123—90          17 Claims

ABSTRACT OF THE DISCLOSURE

An internal combustion engine with valves automatically varied in their crank angle opening duration and timing by cam shift action in relation to the speed and the load upon the engine by a servo-mechanism with a dual reference to the speed of the engine and the flow of the incoming gas controlled by the carburetor throttle. A substantially constant operational efficiency is provided at all engine working speeds and loads with the swept area of the valves constant with the speed but variable with the load upon the engine.

---

This invention contemplates optimizing the performance of a four cycle internal combustion engine at maximum intake by tracking automatically the best torque along its range of operation by progressively and accurately modifying the valve action characteristic or profile as a function of the engine speed to main tain a constant swept area of the valve opening and maximize the volumetric efficiency throughout the selected range of speeds of the engine for exceptionally smooth low speed operation and an increasing power surge at extra high speeds.

This invention contemplates also optimizing the efficiency of operation of a four cycle internal combustion engine at reduced throttle opening by reducing the swept area of the valve operation as a function of the flow of incoming gas by utilizing a cam profile optimized for a speed of operation lower than the one at which the engine is operating at reduced load.

The swept area (SA) is the function of the opening profile and the time duration of this action. As the speed increases, the duration is reduced proportionally and the profile action should increase proportionally to maintain a constant swept area. Inversely, at a given speed the swept area can be reduced by shifting the cam to a lower speed cam profile optimal for the reduced mass of gas corresponding to a reduced flow condition.

Since the principles of Beau de Rochas were embodied in an engine by Otto in 1876, much work has been done regarding combustion problems, in particular the flow characteristics controlled by valve timing, valve opening duration, valve lift and overlap between intake and exhaust valves operation as related to the top dead center (TDC) and bottom dead center (BDC) positions of the piston with various cam profiles for the control and performance of engines for various purposes as related to particular speeds and loads performance. The present art using fixed cam profile has considerably limited the flexibility of engines and it can be said that most engines can be classified between the high torque engine and the low torque engine. The high torque engine has a peak torque at a specific speed of operation and its overall performance falls rapidly above and below this speed, as is the case for tractor engine for example, which cannot operate at low speed. The operation efficiency follows closely the torque characteristic. The low torque engine is a compromise for a lesser peak efficiency but better overall efficiency and is used where flexibility is of prime importance as is the case in automobiles.

This invention is directed essentially to the provision of means for accurately controlling the timing, duration, lift and overlap of the valve openings as a function of engine speed at maximum charge to optimize engine performance and attain a substantially constant unit mixture charge with high volumetric efficiency throughout the range of speed of rotation whereby maintaining the maximum torque throughout the range of operation with subsequent increase in flexibility and substantial constant efficiency.

This invention is also directed to the provision of means for accurately controlling the timing, duration of the lift and overlap of the valve openings as a function of the engine load to optimize the engine performance at reduced mixture charge thereby maintaining the efficiency at reduced power operation, minimizing unburnt fuel and increasing valve longevity.

Accordingly, it is also an object of this invention to maintain the unit charge, volumetric efficiency and the swept area of the valve action profile constant at maximum carburetor throttle opening throughout the engine speed range of operation, whereby the torque is substantially constant and the power output proportional to the speed of rotation.

Furthermore, it is also an object of this invention to maintain the swept area of the valve action proportional to the mass flow of air-mixture intake at reduced carburetor opening, throughout the entire range of engine speeds and loads, whereby the efficiency of combustion and operation is maintained and the torque kept at its highest value considering the controlled reduced charge supplied.

Consequently, it is also an object of this invention to control the flow of air-mixture at any speed and load thereby maintaining the combustion and operation efficiency throughout the entire range of operation.

The engine is characterized by the throttle variably controlling the fuel-air mass supplied for power while the intake and exhaust valve operation times and controls the fuel-air flow to and from the cylinders at all speeds and loads for optimum performance, assuming a potential oversupply capability of the carburetor.

An object of this invention is to control the intake and exhaust valves simultaneously whereby the flow of the mass of gas to and from the cylinder are controlled.

A novel feature of this invention which distinguishes it from the cam-shaft of prior art is varying the exhaust and intake valve overlap at any given speed directly in relation to varying the load while maintaining that speed by an automatic control mechanism which shifts the cam shaft with respect to the other members of the valve train as a combined function of engine speed and torque load throughout the entire engine range.

An object of this invention is to provide means to control the timing of the opening and closing of the valves in an internal combustion engine whereby ingestion and exhaust is accomplished under optimum conditions to obtain the best charging and exhausting with respect to the crank position angle and to the speed and load upon the engine.

A further object of this invention is to maintain a high combustion efficiency of the air-fuel mixture by controlling the flow of gas to and from the cylinders in relation to the amount of air-fuel available and the speed of operation of the engine.

Another object of this invention is to provide means for optimizing the performance of an internal combustion engine by providing a valve cam having a lobe with a longitudinal cam surface of varying radius throughout its length, varying the opening angle, varying the closing angle, varying maximum lift height, which include at least two spaced contours having profiles providing optimum engine performance at different engine speeds and loads at idle and high speed by shifting the cam relative to the valve in one direction over distances which are function of the speed of the engine and in their opposite direction in relation to a decrease in the load.

Another object of this invention is to provide means for equalizing the torque throughout the range of operation at maximum charge with substantially equal efficiency.

A feature of this invention is that the power required to drive the cam shaft varies with the load as the swept area is adjusted to the load thereby reducing the power loss in the engine.

These and other objects and features of this invention will be fully explained in the following description of a preferred embodiment suitable for incorporation in a multi-cylinder, four cycle reciprocating internal combustion engine in which:

FIG. 1 is a schematic-diagrammatic side view in partial section of the valve timing system and engine illustrating the structural relationships of the valves, the cam shaft and the control mechanism;

FIG. 1a is an enlarged sectional view of the control of the camshaft movement by the fuel supply control;

FIG. 2 is an enlarged side elevational view of the intake valve cam and valve lift train shown in FIG. 1;

FIG. 3 is a dual graph showing the relationship of engine speed as the abscissas with the valve lift in inches and the valve duration in degrees of crank rotation shown as separate ordinates that are spaced for direct comparison; and FIG. 4 is a diagrammatic interpretive view of the intake valve and exhaust valve action for speeds up to 6000 r.p.m. in increments of a thousand from which the cam profile can be laid out for follower lifter wheels of a selected relative diameter.

Apropos of engines with which the invention is concerned a few basic considerations will assist in understanding the invention. Power output is directly proportional to the torque and the speed of rotation. The torque is proportional to the amount of air-fuel mixture actually ingested, effectively burned and used in the expansion stroke. The amount ingested each cycle is generally referred to as the Charge which is the weight of air-fuel drawn into the engine on one intake piston stroke during operation. Unit Charge is the weight of air-fuel mixture that would fill the volumetric displacement of a piston in one cylinder. Charge divided by Unit Charge indicates in percentage the rated volumetric efficiency of the system. The higher the volumetric efficiency the greater the torque which is the result of the transformation of the rectilineal force on the piston to the rotational force of the crank. Thereby, power output is directly related to volumetric efficiency, the speed of rotation and the numbers of cylinders involved.

If the volumetric efficiency is substantially constant at all speeds then the expected fuel input and power output at 6000 r.p.m., for example, is approximately six times that expected at 1000 r.p.m. or in direct proportion less than the variations in the loss of the engine.

Theoretically, in an endeavor for volumetric efficiency to be constant, each charge must be substantially constant at all speeds. To approach this the "swept area" (SA) of the valves must be such that the flow area multiplied by the duration of openness must be an equalizing factor for flow conditions of gas to and from the cylinders. This "swept area" can be derived by the integral of the height of the valve opening multipled by the time of the opening as calculated in a four cycle engine with the angle of crank rotation divided by the engine r.p.m. A dimensionless parameter results for purposes herein (minimum acceleration, symmetrical profile) of $(H.\theta/\text{r.p.m.})$ in which $\theta$ represents the total angle in degrees having components referred to herein as $\theta+$ for pre-opening crank angles ahead of TDC, plus 180 degrees of piston stroke movement, plus $\theta$ for the port closing crank angle beyond BDC, or if we refer to the exhaust valve, $\theta+$ is ahead of BDC and $\theta-$ beyond TDC.

It may be observed at this time that "degrees" as used in this specification with respect to valve action relate to crank shaft angles measured in angular degrees from dead centers of the piston and determined in the direction of rotation. With the speed of rotation known, these angles can be expressed in the dimension of time.

Also, it should be noted that gas as measured in weight, has viscosity and mass and requires time for movement because of inertia from a manifold through a valve into the cylinder, or vice-versa, as correlated with pressure differential, temperature and flow area. On the other hand, once moving, the gas also has acquired an inertial momentum which persists after the completion of the theoretical stroke.

For basic considerations it should also be noted that with an intake opening theoretically at some dead center and closing theoretically after 180 degrees at some other dead center, as at very low r.p.m., a charge moving into the cylinder on one intake stroke to fill the piston displacement volume would provide a volumetric efficiency approaching 100%. However, with an increase in r.p.m. this efficiency would decline rapidly with the same valve action because of inertia and would result in a throttle loss because with only a 180 degrees opening at all speeds the surge-induced momentum of incoming mixture does not have time to fully charge the cylinder at high speeds before the intake valve closes. A similar pattern holds true for the exhaust cycle.

At low speeds in conventional engines the overlap is 20 degrees. Both valves are simultaneously open approximately .012″ of an inch at TDC. This communication between the two ports through the cylinder is insignificant at a low speed but the efficiency falls rapidly at high speeds. Therefore the volumetric efficiency can remain high at low speed but drop at high speed. On the other hand, with an overlap of 60 degrees commonly done in conventional high speed engines the volumetric efficiency is strongly affected at low speeds but is less objectionable upwards above 2000 r.p.m. because although the increased angular length of the valve action accommodates momentum, such action is completed in point of less time duration before gas momentums of exhaust leaving and intake entering the cylinder can become opposing.

Therefore, it is noted that expanse of open area, duration of openness, and the timing of the openness are factors important to volumetric efficiency at different speeds in addition to the mass of gas involved. The height of the valve movement has also its limitations due to the geometry of the system.

Assuming now an engine whose torque is maximum at 1200 r.p.m., it follows that as the torque is an indication of the volumetric efficiency, the torque and the power will drop at higher speeds as this efficiency drops, as described above. On the other hand, an engine tuned for a maximum torque at 5000 r.p.m. will not be able to operate at 500 r.p.m. because it becomes so inefficient as not to be able to overcome its own friction. The characteristics of the torque of those engine are parabola shaped and the summit of the curve occurs approximately at the rated torque, i.e., where the engine should operate for maximum efficiency. The "swept areas" of the valve action of conventional engines are not constant, all varying in duration, and optimization can occur at only one speed and throttle opening. Given an engine it is possible to modify the characteristic of operation of such engine by designing a new cam profile to obtain optimum volumetric efficiency at a different speed of operation, but the optimum performances for light and heavy loads at that speed do not coincide. The modification is necessarily detrimental to the performance of the engine in other ranges of operation. A charge smaller than a unit charge at higher speeds does not require a swept area that would be designed for that particular speed.

A constant "swept area" variable valve profile could provide a torque characteristic which can envelop the characteristics of several different discrete specific optimizations. The engine would perform at different specific speeds at least as well as any engines optimized with fixed cam profiles for those specific speeds within a similar basic design of the engine.

In the present invention, in taking advantage of the potentialities of the engine the cam profiles driving the valves in their opening action are designed for optimum volumetric efficiency at maximum charge, namely, the weight of air-fuel charged for each piston stroke is preferably constant and as close to the Unit charge as possible at all speeds, and the emptying of the cylinder is designed for the best possible throughout the range of operation.

Moreover, since the "swept area" is a parameter related to the mass of gas involved, a reduced throttle operating condition at a sustained speed corresponds to a reduced mass of gas as compared to the maximum charge at which the cam profile has been optimized, it is a further concept of this invention to utilize a reduced profile to match this condition of operation. More specifically, to shift the cam shaft in reverse direction to activate the valve with a profile that is optimized for a lower speed at maximum charge. The valve timing duration being shorter at the lower optimization, the "swept area" in this condition is effectively reduced in proportion to the reduced mass of gas involved with one of the advantages being less wear and strain upon the valve trains, and power loss.

These factors and considerations and many others are of concern with this present invention which enables a motor of less cubic inch displacement not only to idle more smoothly at low speed of rotation but also to deliver more power at high speed than conventional displacement rated engines and do so with substantial economies and improved efficiencies in both instances throughout its working range. The invention is characterized by variable cam contours, lobes and heights in which the valve opening—in the example herein—is one graduating in angles as a cubic function of the speed of rotation from 0 degrees to 70 degrees (crank angle) ahead of TDC and closing from 0 to 90 degrees beyond BDC linearly with the speed of rotation from 200 to 6000 r.p.m. The exhaust valve graduates from 10 to 90 degrees ahead of BDC linearly with the speed for opening, and from 10 to 60 degrees beyond TDC as a cubic function of the speed of rotation for the closing. The cubic evolution of the angles corresponds to the overlapping opening of the two valves as mentioned earlier, and is a first approximation to this very delicate timing for a good volumetric efficiency. The linear evolution of the other angles are less important, and result from a compromise between a reasonable height lift of the valves and the constant swept area condition, as all those factors contribute to the volumetric efficiency. The valve height lift is increased from .200″ to .568″ inch for the intake valve and the exhaust valve without specifying the diameter of the valves themselves as it would not essentially change the principle of this design. A minimum acceleration cam profile is chosen to minimize vibration and the mechanical stress on the gears, ease the problem of the drive of the cam shaft, and provide a simple way to compute the integral of the swept area.

Referring to FIG. 1 a portion of a multi-cylinder internal combustion four-cycle gasoline engine is indicated at 10 having a cylinder head 12 and intake and exhaust valves therein represented by the poppet valves 14 and 15, respectively, actuated by an overhead cam system 18 for all cylinders 16 in the block 17. The overhead valve system is representative of two other more common types which relate to the cam shaft being located in the cylinder block and valves either located in the engine block and directly actuated by the cam or located in the head and actuated through intermediate push-rod and rocker assemblies (not shown). In each instance the intake and exhaust valve cams can be located on separate cam shafts if valve stems diverge, or, as shown for simplicity upon one cam shaft 26 without rockers where all valve stems 60 are in the same plane in the head 12.

The cylinder head has angled passages 27 through it for fuel and exhaust and these passages terminate above the pistons 66 in valve seats 33. Concentrically with the seats, the guideways 35 are drilled for the valve stems 37 which extend upwardly from bosses 39 to receive a retainer 41 which restrains valve closing inner and outer compression springs 43 between the retainer and the block in a compressed condition. The strength of the springs 43 is determined by the force necessary to close the valve under uniformly accelerated motion developed at 6000 r.p.m. in the embodiment described. The two springs are coiled springs and are as large in diameter as practicable, one inside the other. They have different moments of inertia to eliminate chatter and vibration. Preferably the outer spring is wound with a varying pitch so that collectively no greater strength is present at any given height than that necessary to close the valve from such height at the engine speed associated therewith.

Concentric with the valve stem 60 a valve lifter support frame 45 bridges the springs 43 and is secured rigidly to the head 12 to receive the valve lifter guide 19 above the valve stems. The lifter guide 19 receives in slidable non-rotatable relationship therein a cylindrical body 47 having an end slot 49 receiving a roller 51 journalled on a pin 53. The lifter is mounted so that the roller 51 always runs in contact with the cam surafce 55 and in the embodiment shown the roller has a slightly rounded tread edge 57 for engaging the cam with a substantially line rolling contact. Clearance adjustments between the valve stem are made in the usual manner, either hydraulically or by adjusting screws.

As shown, the cam shaft 26, is mounted in suitable journals 28 of split bearings 30 on partitions 29 as secured in place by bearing caps 31. The shaft rotates at a one-half speed reduction by a timer chain 34 interconnecting the small crankshaft sprocket 38 and the larger camshaft sprocket 36. The camshaft is also reciprocably mounted for longitudinal movement in the bearings from its resting position at low speed to its fully advanced position at high speed as driven by a thrust bearing 38 which in turn is mechanically connected to an engine speed responsive device which can be servo-hydraulic, or a vacuum powered device controlled by a centrifugally influenced valve, or by servo motor controlled by an amplified signal from an electrical tachometer and transducer. For simplicity the control is represented by a fly ball centrifugal control 39 having pivoted arms 40a each pinned at one end 42 to a collar 43 splined on the threaded end 50 of the camshaft and held against shoulder 43s by lock nut 52, as secured by pin 54, and at the other end to a collar 44 journalled on the head 12 against end bearings 28e so that increasing centrifugal force on the fly balls 46 moves the camshaft to the left, as viewed, against the action of the compression spring 48. The action of the fly balls is controlled by springs 48 and 48s and also a vacuum responsive device 48v. The spring 48 opposes the action of the fly balls, spring 48s assist the fly balls, and the vacuum device counteracts spring 48s.

The spring 48 is adjustably tensioned by lock nuts 56 for coordinating linear movement of camshaft 26 under centrifugal force with the engine speed while spring 48s is contained within a bellows 48b and not only holds the collar 38 against the end of bearing 28e but variably acts to assist the spring 48 in reducing the valve opening overlap controlled by the centrifugal action of the fly balls. The interior of the bellows is in communication with the intake manifold 96 through a conduit 98 so that when the butterfly valve 92 of the carburetor 90 is moved towards closed position by control of the accelerator and the pressure in the intake manifold drops, the bellows tends to contract spring 48s and permit the cam shaft to shift to the right under the dominant influence of spring 48.

The cams are indicated at 20 and reference may be made to FIGS. 3 and 4 for further details of their performance contours, wherein cam 20i indicates the action of the intake valve cam structure and cam 20e indicates the action of the exhaust cam. The description which follows relates to both where numerals are without suffix, but relate to a particular cam in relation to the suffix "i" for intake and "e" for exhaust. It should also be noted that the curves indicating the cam action show the actual cam action and are not shown conformed for ultimate cam contour in relationship to the diameter of a particular roller 51 rectilineally cooperating therewith. They indicate the movement resulting at the axis of rotation of the roller.

In FIG. 3 the operational effect of cam 20i is shown by conjoint graphs where engine speed is shown in increments of 1000 r.p.m. along the vertical axis 80 and the crankshaft angles are charted on the horizontal axis 82 in the left portion 84 and the valve lift in inches in the right portion 86 for comparison to indicate the cam profile involved in maintaining the swept area (SA) of the valve openings constant at all speeds for a substantially constant high volumetric efficiency at all speeds at full throttle in accordance with the equation for the example engine design given.

$$SA = H \frac{\angle \theta}{r.p.m.}$$

in which $SA = 32.20° \cdot 10^{-3}$
$H$ = valve lift distance in inches
$\angle \theta = \theta+$ plus $\theta-$ plus $180°$
$H$ and $\theta+$ and $\theta-$ are adjusted for minimum acceleration of the moving valve train parts, and empirically for turbulence.

The optimization is done for discrete value of speed in a geometric progression although it is shown in an arithmetic progression.

The shaded areas in the curves of FIG. 3 indicate the reduced SA desired cam shift effect controlled by reduced throttle and an accompanying increase of vacuum in the intake manifold as described herein, it being noted that the valves are adjusted proportionally to the mass of gas involved throughout the speed range.

In FIG. 4, data of FIG. 3 is charted graphically for 360° of cam rotation superposed on 720° for four-cycle crankshaft rotation depicted positionally by the TDC and BDC indication and the labelled function of the piston strokes, the relative speeds of the two being the conventional ratio of 1 to 2. The characteristics of the curves are indicated in summation tables on the right for intake and on the left for exhaust.

Although the curve characteristics of the exhaust can be substantially indentical to the intake curve characteristics, it is appreciated that it is desirable to evacuate the exhaust gases as completely as possible irrespective of speed. Therefore the swept area of the exhaust valve can be greater at lower speeds, being limited only by consideration of: (1) minimum acceleration; (2) no opening overlap between valves; and (3) lift distances for mechanical and geometric considerations. The actual opening is adjusted by the size of the valve while the SA is maintained constant according to the concept. The higher speed swept areas are substantially the same, the curve H in FIG. 3 being a little straighter and rotated slightly counterclockwise about a point indicating 3500 r.p.m.

The carburetor is indicated at 90 which has the capability of delivering a fuel and air mixture necessary to provide a volumetric efficiency of 100% to the cylinders at the rated top engine speed when the throttle valve 92 thereof is substantially fully opened as by the fuel supply foot pedal 94, it being appreciated that the foot pedal may be controlled to deliver lesser amounts of fuel-air for speed control over a range including an idling speed as low as 200 r.p.m. The intake manifold 96 begins below the throttle valve 92. The carburetor is otherwise conventional in providing fuel-air mixtures which are appreciably enriched at low demand and high demand but with greater accuracy for the following reasons. The accelerator pump well (not shown) is of reduced capacity since there is no sudden urge of air when the carburetor valve is suddenly opened to full throttle at any engine speed. What the carburetor can supply will not be accepted by the intake valves at a given speed, only that amount that is controlled by the action of the valves at that speed. Thereafter the speed increases, the valve openings increases as shown by the curves, and increasing amounts of fuel-air are supplied with the increasing speed because the cams increase the opening area to maintain swept area and volumetric efficiency for higher speeds until the engine reaches the desired speed for the load at which time the throttle is relaxed to carry the load at the speed desired, the intake manifold vacuum increases, and the valve openings adjust accordingly to provide the reduced swept area needed for that fuel under that load and speed, further acceleration not being desired.

Thus, considering constant volumetric efficiency which contemplates a constant unit charge each piston stroke regardless of speed, it is to be noted that the effective opening of the valves at lower speeds is determined in relation to the novel volumetric efficiency pattern discussed in which maximum demand possible on the carburetor at any speed, even though the carburetor is opened to full throttle, is that fraction of the possible demand that the engine speed bears to maximum speed at full throttle. Thus, the efficiency of the carburetor as related to fuel mixtures coordinated with engine speeds can be more carefully evolved for different or varying speeds and loads and cannot be disrupted in an endeavor to over-throttle the engine, yet the resulting engine speed-up is a controlled increase of power in relation to the ability of the engine to increase its speed under an imposed load. The effective opening of the valves at lower speeds is determined in relation to said volumetric efficiency and unit charge throughout the other speeds as though the engine loaded at full throttle would maintain constant speed at that load and throughout the speed range. It was found that a desirable very low idling speed with quiet valve actions could be attained without depriving the engine of full power delivery at extra high speed with a burst of power within the capability of the carburetor at an efficient full throttle.

It will be understood how the stated objects and novel results are attained and how various motor designs can utilize cam systems as described here merely by selecting a high speed, above or below the 6000 r.p.m. utilized herein for purposes of explanation, determine on a volumetric efficiency at that speed, provide a carburetor that will deliver the selected maximum full demand and derive an idling speed of as low as 200 r.p.m. which operates at the same volumetric efficiency regardless of manually overthrottling the air-fuel supply at any given speed without departing from the spirit of the invention.

What is claimed is:

1. In an internal combustion engine having a crankshaft operable at a varying speed, a combustion chamber defined by a cylinder and a piston connected to the crankshaft and reciprocable therein, a source of an air-fuel combustible mixture, and a valve for admitting a unit charge of said air-fuel mixture to the combustion chamber, the combination of a camshaft driven by the crankshaft in timed relation to the reciprocation of the piston, valve lifter means urging said valve to its closed position, cam means upon said camshaft characterized by gradient radial dimensions in an axial direction and a gradient angular width in the same direction on both sides for actuating said valve lifter means to open the valve various distances and for various angular distances of rotation of the crankshaft to provide a constant swept area for the valve opening throughout the working speed range of the engine as computed on the total area of opening of the valve multiplied by the time increment that such is open, and means for axially shifting said camshaft and lobe in arithmetic relation with the speed of the crankshaft to vary directly therewith the time increment and said swept area accordingly.

2. The combination called for in claim 1 in which the engine has a plurality of combustion chambers and the constant swept area is directly proportional to the unit charge for each piston stroke of evenly spaced intake strokes repeated at half the rate of the speed of rotation of the engine.

3. The combination called in claim 1 in which the movement of the valve is confined to 180 degrees movement of the crankshaft between TDC and BDC of the piston at its lowest speed.

4. The combination called in claim 1 in which the angular length of opening of the valve increases with the speed of rotation of the engine, the pre-opening angle before TDC folowing approximately a third order function of the speed, and the post-opening angle after BDC, a first order of the speed.

5. The combination called for in claim 1 in which the swept areas of the valve are constant in accordance with the integral $$SA = \int_{t_1}^{t_2} h dt = \text{constant}$$

wherein $t_1$ and $t_2$ are opening and closing times, respectively, and in a symmetrical profile $$SA = H \frac{\angle \theta}{\text{r.p.m.}} = \text{constant}$$

6. The combination called for in claim 1 in which the total number of unit charges ingested by the piston into the chamber in a given time varies directly as the speed of the crankshaft.

7. The combination called for in claim 1 in which the air-fuel mixture is throttled back to reduce the amount of charge into the cylinder, and includes means for reducing the said swept area at a given speed proportionally to the mass of gas by shifting the camshaft to corresponding lower speed opening action.

8. Combination called for in claim 7 in which the said swept area is proportional to the mass of gas ingested.

9. A reciprocating piston device having a crankshaft operable at varying speeds, a compression chamber defined by a cylinder and a piston connected to the crankshaft and reciprocable therein, valve means placing said chamber in connection with the atmosphere, the combination of a camshaft means driven by the crankshaft in timed relation to the reciprocation of the piston, valve lifter means urging said valve to its closed position, a cam means upon said camshaft means characterized by gradient radial dimensions in an axial direction and a gradient angular width in the same direction on both sides actuating said valve lifter means to open the valve means various distances and for various angular distances of rotation of the crankshaft to provide a constant swept area for the valve openings throughout the working speed range of the engine as computed on total area of the opening multiplied by the time increment that such is open, and means for axially shifting said cam shaft means and lobe in arithmetic relation with the speed of the crankshaft to vary directly therewith the time increment and swept area accordingly.

10. The combination called for in claim 9 in which the swept area is proportional to the mass of gas in flowing per unit of time.

11. The combination called for in claim 9 in which the valve opens a lineal distance less than .3″ below two thousand r.p.m. for idling.

12. The combination called for in claim 9 in which the evolution of the closing angle with respect to the crank angular rotation follows a third order function of the speed of rotation, at corresponding maximum intake charge.

13. The combination called for in claim 9 in which said valve means includes an intake valve and an exhaust valve and said cam means include two cam lobes having substantially the same contour profiles angularly spaced from each other in their operation and symmetrical in their evolution with respect to TDC angle position, the exhaust cam lobe preceding TDC and the intake cam lobe following TDC on the breathing cycle of the chamber and piston, said valve lifter means comprising two lifters moving the valves to closed position independently, said valve openings of the two valves each having an overlap at the same terminals of approximately 140 degrees at TDC at high speed and maximum charge, said overlap varying proportionally with speed of the crankshaft as a third order function at maximum charge and said overlap varying proportionally with the charge ingested by limitation from the carburetor throttle.

14. In an internal combustion engine having a crankshaft operable at various speeds, a combustion chamber defined by a cylinder and a piston connected to the crankshaft and reciprocable therein, a source of an air-fuel combustible mixture manually controlled between closed and full throttle opening, and a valve for admitting a variable charge of said air-fuel mixture to the combustion chamber at each intake stroke, another valve for emptying the cylinder at each exhaust stroke, the combination of a camshaft driven by the crankshaft in timed relation to the reciprocation of the piston, valve lifter means urging said valves to their closed position, cam means upon said cam shaft for each valve characterized by gradient radial dimensions in an axial direction and a gradient angular width on both sides in the same direction for actuating said valve lifter means to open the valves various lineal distances and for various angular distances of rotation of the crankshaft to admit said variable charge each intake stroke and emptying the products of its combustion at each exhaust stroke throughout the working speed of the engine, and means for automatically shifting said camshaft and cam means continuously in an axial direction in relation to the speed of the crankshaft and charge to vary directly therewith the time increment and said profile opening to provide a constant swept area for the intake valve opening and a similar relationship for the exhaust valve opening as computed on total area of opening multiplied by the time increment that such is open.

15. In an internal combustion engine having a crankshaft operable at a varying speed, a combustion chamber defined by a cylinder and a piston connected to the crankshaft and reciprocable therein, a source of an air-fuel combustible mixture capable of delivering full fuel demand of the engine at its rated top speed and a valve for admitting said air-fuel mixture to the combustion chamber, another valve for emptying said cylinder, the combination of a camshaft driven by the crankshaft in timed relation to the reciprocation of the piston, valve lifter means urging said valve to its closed position, cam means upon said cam shaft characterized by gradient radial dimensions in an axial direction and a gradient angular width in the same direction on both sides for actuating said valve lifter means to open the valve various lineal distances and for various distances of rotation of the crankshaft to provide predetermined swept areas for the valve openings to take and exhaust said full fuel demand at said rated speed of the engine, said cam means providing reduced swept area openings at a reduced charge corresponding to a lower speed maximum charge cam profile that is lesser by the proportion that a lower r.p.m. bears to higher actual operating r.p.m. as directly related to the mass of gas ingested by unit of time, and means for axially shifting said camshaft and cam means in relation with the speed of the crankshaft to vary directly therewith said swept areas accordingly.

16. In an internal combustion engine having a crankshaft operable at a varying speed, a combustion chamber defined by a cylinder and a piston connected to the crankshaft and reciprocable therein, a source of an air-fuel combustible mixture, and a valve for admitting said air-fuel mixture to the cylinder at various quantity pressure and speed to the combustion chamber, another valve for emptying the cylinder into the atmosphere after working stroke controlling the flow of gas from said cylinder at pressure, speed and quantity proportional to the ingestion of unburned air-fuel mixture, the combination of a camshaft driven by the crankshaft in timed relation to the reciprocation of the piston, valve lifter means urging said valve to its closed position, cam means upon said cam shaft characterized by gradient radial dimensions in axial direction and a gradient angular width in the same direction on both sides for actuating said valve lifter means for opening the valves various distances and for various angular distances of rotation of the crankshaft to provide a variable overlap valve angle opening symmetrical in angle to TDC, means for minimizing incoming air-fuel from flowing unburned directly through the cylinder to the atmosphere.

17. The combination called for in claim 15 in which the exhaust valve opening angles and the intake valve opening angles vary proportionally to the quantity intake manifold pressure and velocity to maintain an efficient combustion and working cycle.

References Cited
UNITED STATES PATENTS

| | | |
|---|---|---|
| 1,687,082 | 10/1928 | Cole. |
| 1,688,164 | 10/1928 | Tarrant. |
| 1,863,875 | 6/1932 | Rabezzana. |
| 2,804,061 | 8/1957 | Gamble. |
| 2,969,051 | 1/1961 | Webster. |

AL LAWRENCE SMITH, Primary Examiner

U.S. Cl. X.R.
123—188